United States Patent [19]

Ragsdale et al.

[11] Patent Number: 5,074,526

[45] Date of Patent: Dec. 24, 1991

[54] IN-LINE FLUID FLOW CONTROL VALVE WITH APPARATUS FOR AND METHOD OF INSTALLATION IN AN EXISTING FLUID CONDUIT

[75] Inventors: Waymon Ragsdale; Lee Goodson, both of Mineola, Tex.

[73] Assignee: Mineola Valve & Hydrant, Inc., Mineola, Tex.

[21] Appl. No.: 405,764

[22] Filed: Sep. 11, 1989

[51] Int. Cl.[5] .................... F16K 3/00; F16K 3/314; F16K 43/00
[52] U.S. Cl. ................................ 251/267; 137/15; 137/318; 251/282; 251/326; 251/327; 251/329
[58] Field of Search ............... 137/15, 315, 318; 251/266, 267, 268, 269, 270, 282, 326, 327, 328, 329

[56] References Cited

U.S. PATENT DOCUMENTS

| | | | |
|---|---|---|---|
| 2,420,849 | 5/1947 | Wilson | 251/326 |
| 2,757,897 | 8/1956 | Cline | 251/266 |
| 2,815,187 | 12/1957 | Hamer | 251/327 |
| 3,135,284 | 6/1964 | Magos | 251/327 |
| 3,240,227 | 3/1966 | Burkholder | 137/318 |
| 3,948,282 | 4/1976 | Yano | 137/318 |
| 4,051,863 | 10/1977 | Still | 251/329 |
| 4,162,058 | 7/1979 | Ellis | 251/326 |
| 4,483,514 | 11/1984 | Kennedy | 251/327 |
| 4,532,957 | 8/1985 | Battle et al. | 251/266 |

FOREIGN PATENT DOCUMENTS

| | | | |
|---|---|---|---|
| 1100609 | 1/1968 | United Kingdom | 251/266 |
| 1379675 | 1/1975 | United Kingdom | 251/326 |
| 1385238 | 2/1975 | United Kingdom | 251/329 |

Primary Examiner—George L. Walton
Attorney, Agent, or Firm—Ronald B. Sefrna

[57] ABSTRACT

The present invention provides an in-line fluid flow control valve adapted and designed for installation in an existing fluid line carrying fluid under pressure, without the necessity of interrupting flow of fluid through such line, and further provides apparatus for installation of the valve of the invention and a method of installation of the valve of the invention. The valve of the invention generally comprises a valve body having a sleeve to be placed around the fluid line and a neck extending outwardly from the sleeve, a double acting and hydraulically balanced valve member to seal the fluid line and the neck of the valve body, and a valve actuating assembly to operate the valve and to maintain proper alignment of the valve member. The installation apparatus of the invention generally comprises a hollow body releasably attachable to the neck of the valve body, having a closure valve to selectively separate the interior of the hollow body from the neck of the valve body and the interior of the fluid line, a cutting device to penetrate the fluid line, and a reaming device to precisely size the line penetration and prepare the inner surface of the fluid line for efficient seating of the valve member thereon.

25 Claims, 8 Drawing Sheets

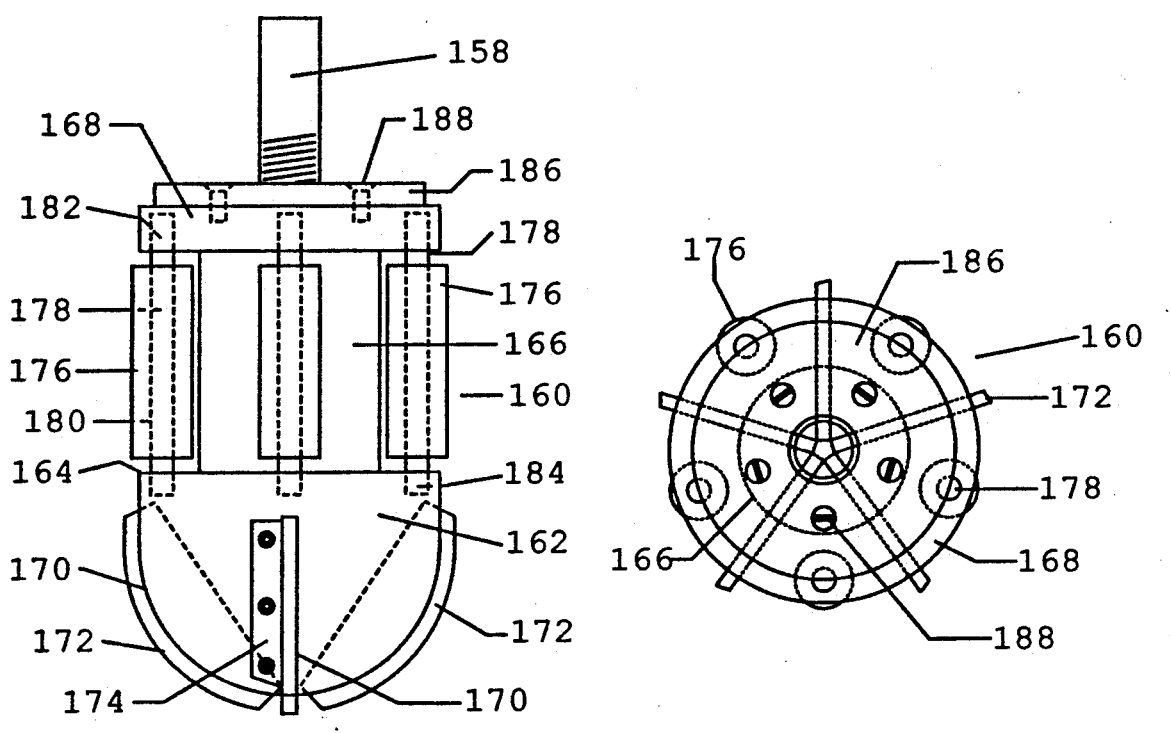
FIGURE 11
FIGURE 12
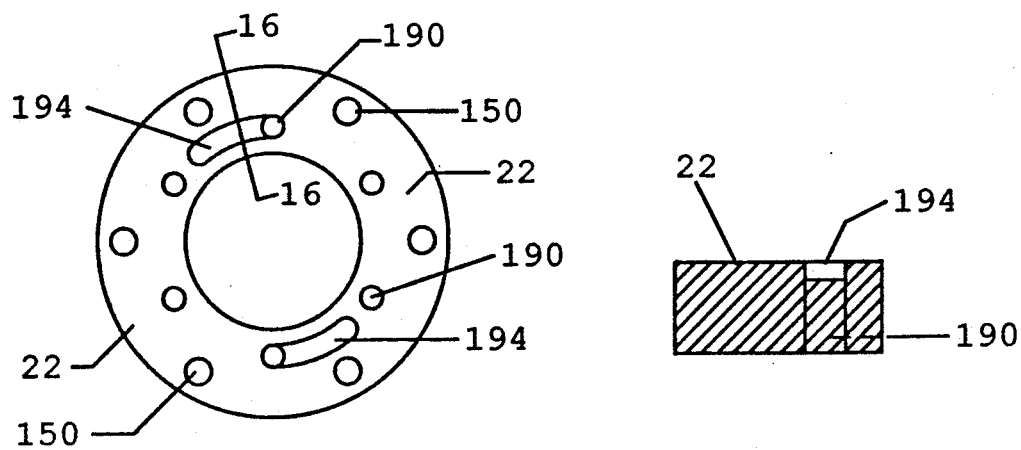
FIGURE 15
FIGURE 16

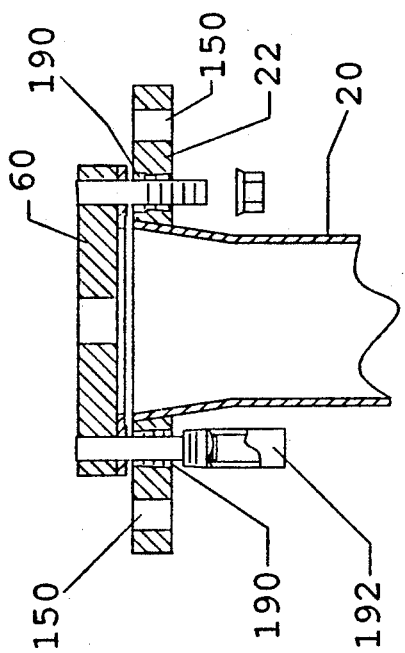
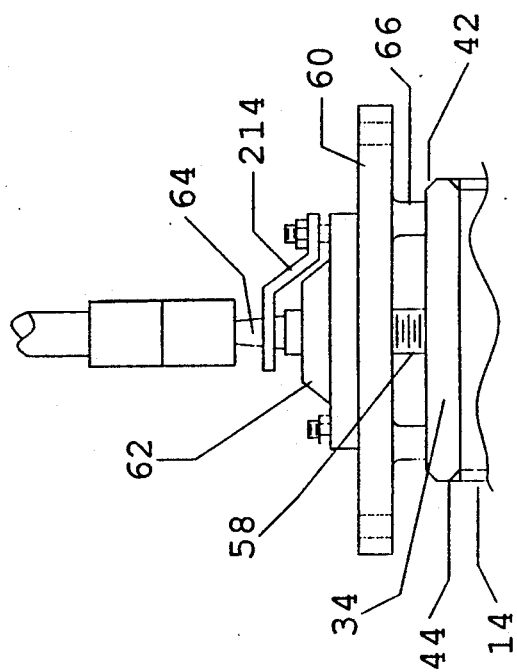
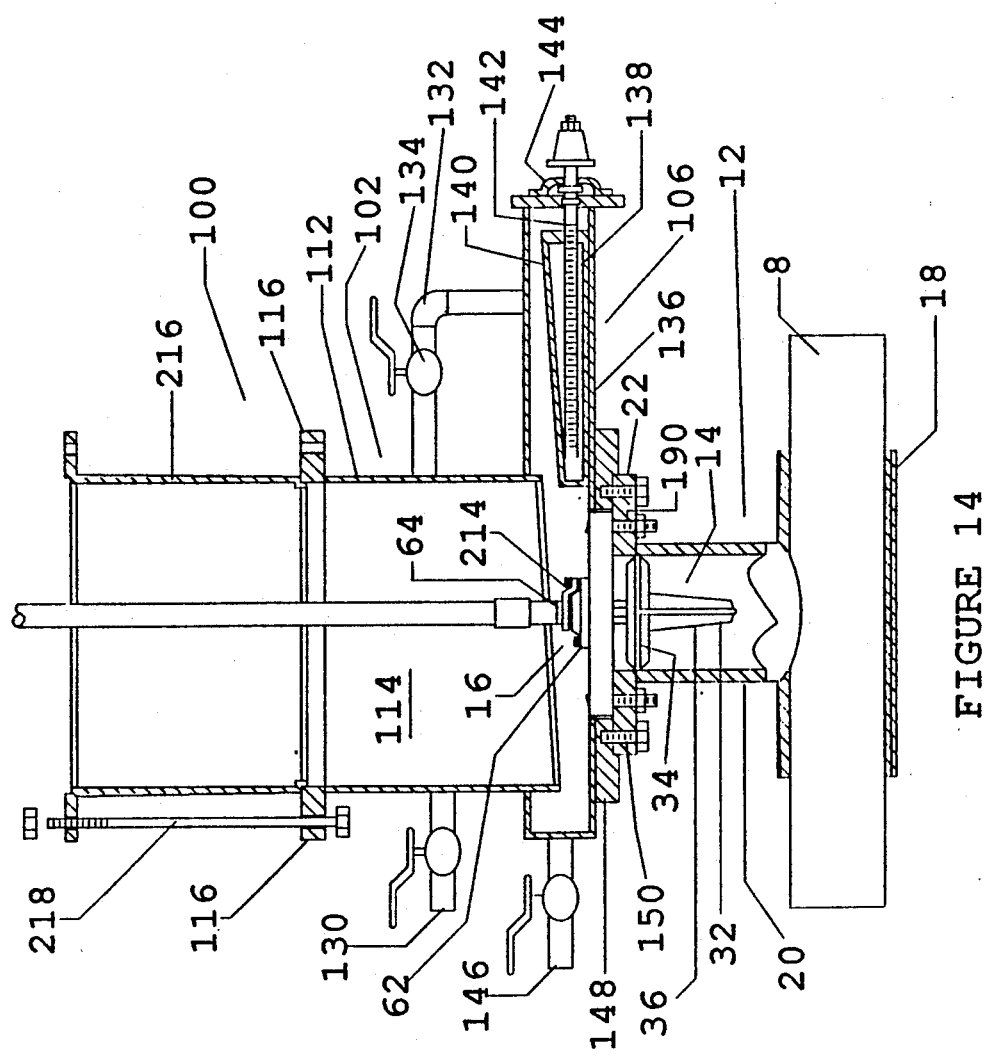

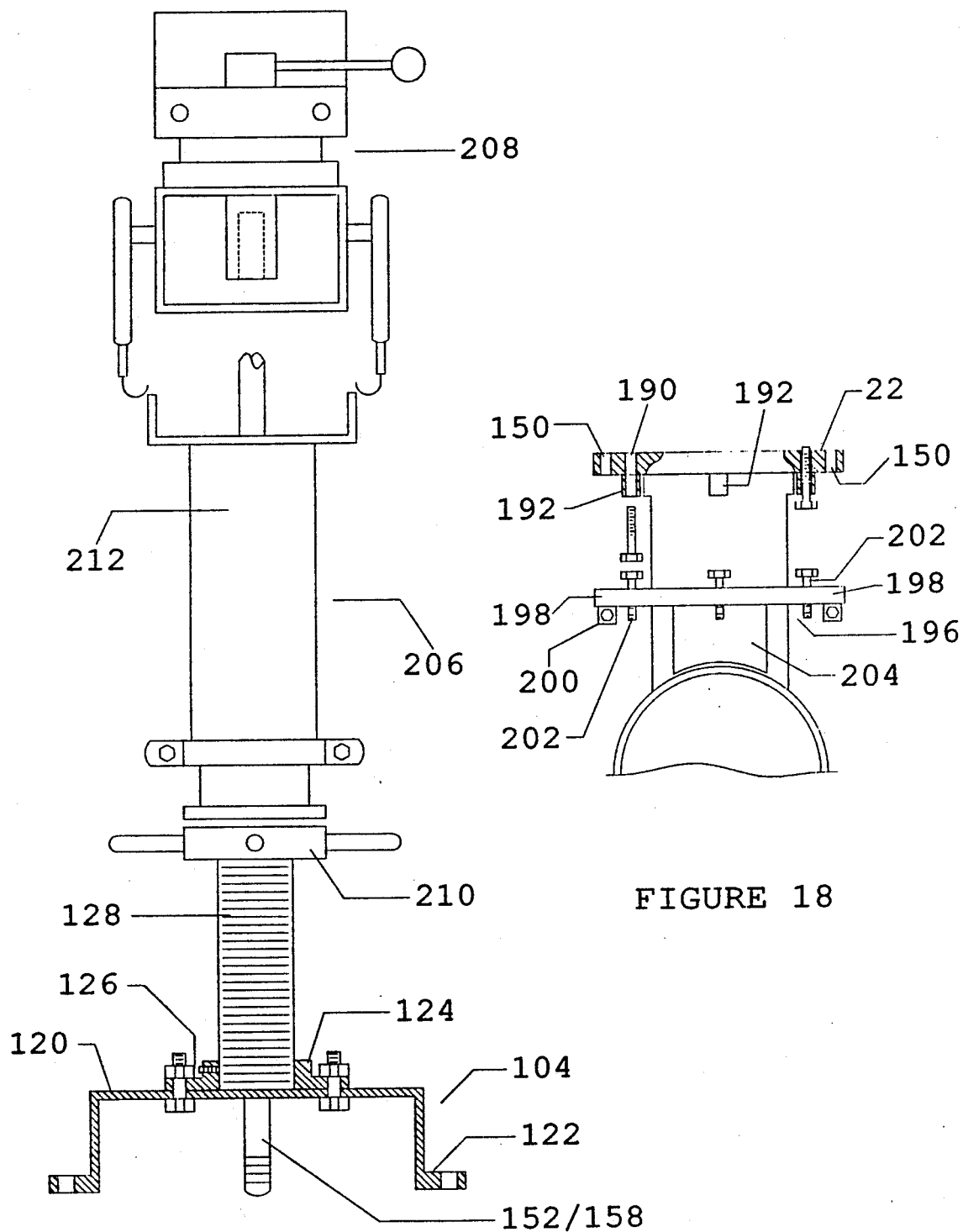

IN-LINE FLUID FLOW CONTROL VALVE WITH APPARATUS FOR AND METHOD OF INSTALLATION IN AN EXISTING FLUID CONDUIT

FIELD OF THE INVENTION

The present invention generally relates to fluid flow control valves and to apparatus and methods of installation, and in one of its embodiments more specifically relates to a double acting hydraulically balanced valve for installation in a fluid line carrying pressurized fluid without release of pressure or interruption of flow, and to an apparatus for and a method of installation of such valve in such a fluid line.

BACKGROUND OF THE INVENTION

It is common in fluid piping systems, such as municipal, industrial, and institutional water supply systems, for there to be extended runs of fluid piping between valves. As a result, it has been necessary to shut down extensive segments of the piping system in order to perform repairs or other work in a small section of the system. The interruption of fluid flow through the system or extensive parts of the system is usually inconvenient at the least, and may have serious economic or safety ramifications. In some situations, such as water supply systems to hospitals, shut down for even a brief period is impracticable.

Several different approaches to placement of valves in piping systems without interruption of fluid flow through the system have been attempted and are known in the prior art, but none of the known approaches has provided a fully coordinated and fully effective solution of the problem. One approach is illustrated by U.S. Pat. No. 3,633,598 to Morris, et. al., which discloses an apparatus and method for inserting a spade valve between the flanges of a joint in a fluid line. While perhaps of significant benefit in association with a piping system characterized by flanged joints, when such a flanged joint occurs in a location where insertion of a valve is required, this approach is, by its nature, limited, and of no benefit in a system in which pipe sections are joined by means other than flanges.

Another approach consists essentially of cutting a slot-like opening partially or wholly through the pipe, in a plane perpendicular to the longitudinal axis of the pipe, and inserting a spade-type valve member into or through the slot. Interruption of fluid flow is achieved by sealing of the faces of the spade valve member against the edges of the slot or ends of the fully severed pipe. Various embodiments of this basic approach are illustrated by U.S. Pat. No. 3,703,906 to Tickett, U.S. Pat. No. 3,749,108 to Long, and U.S. Pat. No. 3,785,041 to Smith. This approach may present difficulties in achieving a positive seal of the valve member against the ends of the pipe at the point of severance, and full severance of the pipe is undesirable in many situations, in that it results in a break in the integrity of the pipe. Further, in many instances, the means of cutting the slot are integral with the valving apparatus and remain in place after installation of the valve, increasing the complexity and cost of the apparatus used in the practice of this approach.

Yet another approach is generally characterized by cutting a circular hole through the wall of the pipe, with the hole centered on an axis perpendicular to the longitudinal axis of the pipe, and insertion of a generally cylindrical plug valve member into the interior of the pipe through the hole. Pressure is then imposed against the top of the plug valve member, which is typically constructed of an expandable material such as rubber, in order to cause the plug valve member to expand to fill and block the interior of the pipe. This approach is illustrated by U.S. Pat. No. 3,799,182 to Long, U.S. Pat. No. 3,948,282 to Yano, and U.S. Pat. No. 4,552,170 to Margrave. While this approach is effective in many situations, it does not address certain problems inherent in many fluid distribution systems. In order to achieve a complete seal between the expandable valve member and the inside surface of the pipe in which the valve is to be installed there must be full contact between the surface of the valve member and the inner surface of the pipe. If the pipe has been in service for any period of time, especially in a water distribution system, the inner surface of the pipe will typically be corroded and/or contain mineral deposits, so that the pipe surface is rough and irregular and a secure seal against that surface is difficult to achieve. The rough inner pipe surface and the rough edges of the hole cut into the wall of the pipe for installation of the plug valve member generally cause damage to the plug valve member when it is forced tightly against those surfaces and edges, and the number of opening-closing repetitions which may be performed before failure of the plug valve member is limited. In addition, because of the close dimensional tolerances required, a different plug valve member must be produced for each different pipe wall thickness, even within the same nominal pipe diameter, increasing the cost of both manufacture and inventory maintenance.

Therefore, there remains a need in the industry for an inline fluid flow control valve, as well as apparatus for and method of installation of such a valve, which enables a user to effectively install such a valve in a fluid line, under pressure, without interrupting the flow of fluid through the line, and without encountering the disadvantages that have not been addressed by the prior art. It is, accordingly, among the objects of the present invention to provide a valve apparatus which achieves a positive closure of the fluid line without damage to the valve member, which is useable in a single size with a variety of fluid line wall thicknesses within the same nominal line size, and which may be effectively operated through a large number of opening-closing repetitions without failure. It is further among the objects of the present invention to provide an apparatus for installation of the valve of the invention, and a method of installation of the valve of the invention utilizing the installation apparatus of the invention.

SUMMARY OF THE INVENTION

The valve of the present invention, as installed in a fluid line, includes a body generally configured as a conventional tapping sleeve, having an elongate longitudinally divided first hollow tubular member to be secured around the outer circumference of the fluid line to receive the valve and a second hollow tubular member, or neck, interconnected at one end to the first member intermediate its two ends with the hollow interiors of those members in communication, a double acting valve member having a spade portion to seal against the interior of the fluid line and a disk-like portion interconnected perpendicular to the spade portion to seal against the interior of the neck member of the body, and a valve actuating member having a flange to seal the open end of the neck member of the body, a threaded shaft for actuation of the valve member, and valve member alignment rods to maintain the desired alignment of the valve member relative to the fluid line.

The installation apparatus of the present invention generally comprises an elongate hollow body adapted to be releaseably attached to the open end of the neck of the tapping sleeve or valve body and being divided into upper and lower chambers by means of a closure valve disposed intermediate the two ends of the installation apparatus body, a cutting device to be inserted through the interior of the body of the installation apparatus and through the neck member of the valve body to penetrate the wall of the fluid line, and a reaming device to smooth and accurately dimension the edge of the hole cut in the fluid line and to smooth and accurately dimension the interior surface of the fluid line to receive the sealing edges of the valve member. The installation apparatus also includes sealing means adapted to seal the upper end of the body of the installation apparatus against fluid flow during the cutting, reaming, and valve member insertion operations.

In practicing the method of the invention, the valve body, or tapping sleeve, is installed with the first tubular member surrounding and firmly interconnected to the fluid line to be valved, and with the neck member extending perpendicular to the fluid line in the desired, typically vertical, direction. A sealing liner is provided between the inner surface of the first tubular member of the valve body and the fluid line to prevent escape of fluid through any annular space between those surfaces, and the first tubular member is typically tightened around the fluid line by a plurality of bolts disposed along the line of its longitudinal division, although other convenient means of interconnection may be used. When the valve body is securely installed on the fluid line in the desired position the body of the installation apparatus is interconnected to the free end of the neck member of the valve body in fluid-tight relation, with the longitudinal axes of the body of the installation apparatus and of the neck of the valve body in alignment such that a passageway is formed through the body of the installation apparatus and the neck of the valve body to the wall of the fluid line. The cutting device of the installation apparatus, which generally comprises a short open ended tubular member concentric with and interconnected at one end to the end of an elongate shaft and provided with saw teeth at its other end, is inserted into the open upper end of the body of the installation apparatus with the shaft of the cutting device extending outwardly from that upper end, through the installation apparatus and into the neck of the valve body with the tubular member of the cutting device in a close fitting concentric relation to the neck. The sealing means of the installation apparatus is attached to the upper end of the body of the installation apparatus in fluid-tight relation, with the shaft of the cutting device extending through the sealing means and allowed to rotate relative thereto without loss of the fluid seal. The shaft of the cutting device is rotated, causing the tubular member to rotate, and the cutting device is moved through the neck of the valve body into contact with the wall of the fluid line. As rotation of the cutting device is continued, the saw teeth cut into the wall of the fluid line until the line is penetrated and a portion of the wall is removed. Upon penetration of the wall of the fluid line fluid flows from the line, up the neck of the valve body and into the interior of the body of the installation apparatus, at line pressure. The installation apparatus may be provided with various bleed valves to allow pressure release and equalization between portions of the apparatus, and fluid may be allowed to flow from the fluid line through one or more bleed valves in order to wash cutting debris away from the fluid line to prevent contamination.

The cutting device is then drawn into the upper chamber of the body of the installation apparatus and the closure valve is operated to separate the upper and lower chambers of that body and isolate the upper chamber from the fluid line. The installation apparatus closure means is removed, the cutting device is removed, and the reaming device is installed in essentially the same manner as the cutting device, and the closure means is replaced on the body of the installation apparatus. The closure valve may now be opened and the reaming device lowered through the body of the installation apparatus and through the neck of the valve body to contact the fluid line. The reaming device of the installation apparatus of the invention generally comprises a cylindrical body concentric with and interconnected to an elongate shaft at one end, and provided at its other end with a plurality of curved plates each adapted to provide a cutting blade at its outer edge. The body of the reaming device is adapted to be received within the neck of the valve body and allowed to rotate and move longitudinally relative thereto with relative freedom while maintaining true alignment between the axis of rotation and the longitudinal axis of the neck of the valve body, such that a precise reaming cut may be obtained upon rotation of the reaming device.

The reaming device is rotated and forced against the fluid line to precisely ream the edges of the sawed penetration through the wall of the fluid line. Fluid may be bled from the installation apparatus during the reaming operation, as during the initial cutting operation, in order to remove debris and prevent fluid contamination. As the reaming device extends through the wall of the fluid line the cutting edges are brought toward contact with the inner surface of the fluid line in the area against which the valve member will seat, and those cutting edges act to remove deposits from that inner surface. By the time the cutting edges have achieved full contact with the inner surface of the fluid line all deposits will have been removed and a polished valve seating surface will have been prepared to receive the sealing edges of the valve member. The reaming device may also be used to adjust the inside diameter of the fluid line at the valve sealing point by removal of a portion of the fluid line wall, allowing the valve member dimensions to be standardized for use with a given nominal pipe dimension regardless of wall thickness. The reaming operation may be easily repeated periodically, as needed, to resurface the inner surface of the fluid line and ensure maintenance of a secure seal between the valve member and fluid line for effective valve operation over an extended time period.

Upon completion of the reaming and polishing operation the reaming device is removed from the valve body and installation apparatus and the interconnected valve member and valve actuating member of the invention are inserted, following the general steps outlined above. As the valve member and valve actuating member are moved through the body of the installation apparatus, the valve flange is brought into contact with a flange provided at the neck of the valve body and the flanges are interconnected to form a fluid-tight seal therebetween, thereby interconnecting the valve actuating member to the neck of the valve body and completing the valve installation. Upon interconnection of the valve flange to the neck of the valve body the installation apparatus may be removed. When the valve is closed, placing the valve member within the fluid line, the sealing edges of the spade portion of the valve member form a fluid-tight seal against the inner surface of the fluid line and the disk-like portion of the valve member forms a fluid-tight seal against the inner surface of the neck of the valve body, preventing flow of fluid both through the fluid line and up the neck of the valve body without the necessity of forming a seal against the edges of the penetration cut into the wall of the fluid line.

Since impediments to formation of a secure seal are eliminated and the valve member of the invention is not subject to damage from foreign matter and abrasive surfaces, the present invention provides a fully operational in-line control valve which may be successfully operated repeatedly without significant concern over failure of the valve to re-seal once opened. The present invention may also be utilized to provide a branch line from the original fluid line, by including a lateral tap in the neck of the valve body in the area of the neck traversed by the disk-like portion of the valve member during operation of the valve.

These and other features and advantages of the preferred embodiment and major alternative embodiments of the invention will be described in detail with reference to the accompanying drawing figures.

BRIEF DESCRIPTION OF THE DRAWINGS

FIG. 11 is an elevation view of the reaming device component of the installation apparatus of the invention.

FIG. 12 is a top view of the reaming device component of the installation apparatus of the invention.

FIG. 13 is an elevation view of the actuating means of the preferred embodiment of the installation apparatus of the invention.

FIG. 14 is a sectional elevation view of the valve of the invention installed in a fluid line with the installation apparatus of the invention, including extension cylinder, installed upon the valve body.

FIG. 15 is a plan view of the preferred embodiment of the neck flange of the valve of the invention.

FIG. 16 is a partial sectional view of the preferred embodiment of the neck flange of the invention along line 16—16 of FIG. 15, showing a valve locator groove.

FIG. 17 is a sectional elevation view of the neck flange and a portion of the neck of the valve body, with the valve flange in place thereon.

FIG. 18 is an elevation view of an alternative blowout preventer assembly for the installation apparatus of the invention, installed on the neck of the valve body of the valve of the invention.

FIG. 19 is a partial elevation view of the valve actuating assembly and valve member of the valve of the invention, with the anti-spin bracket and installation shaft attached thereto.

Figure 1:
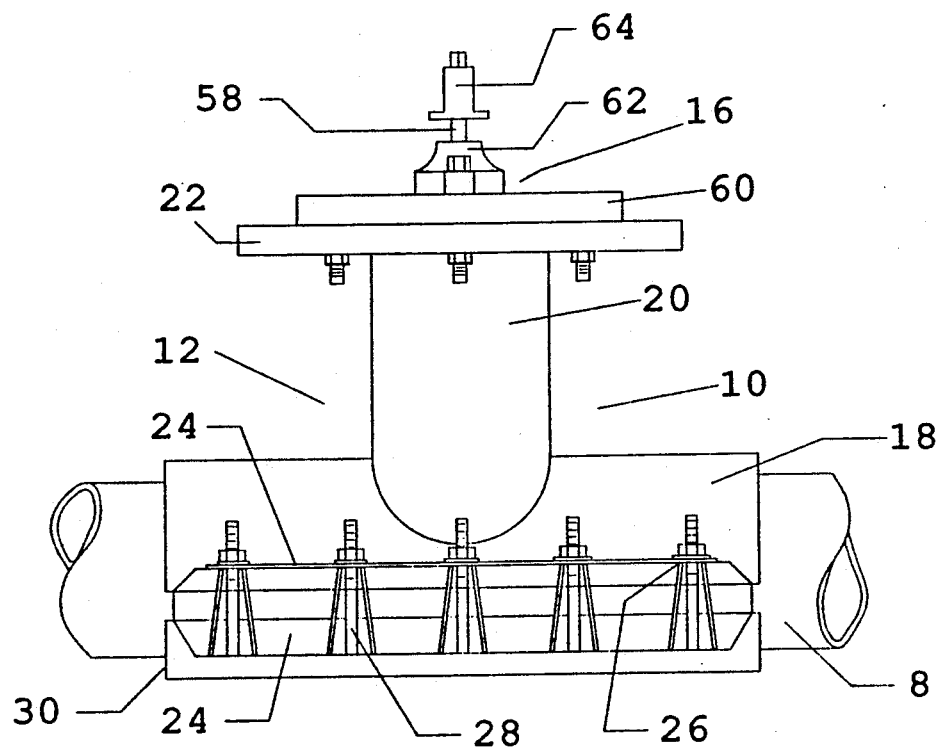
FIG. 1 is a side elevation view of the valve of the invention as installed in a fluid line.
Figure 2:
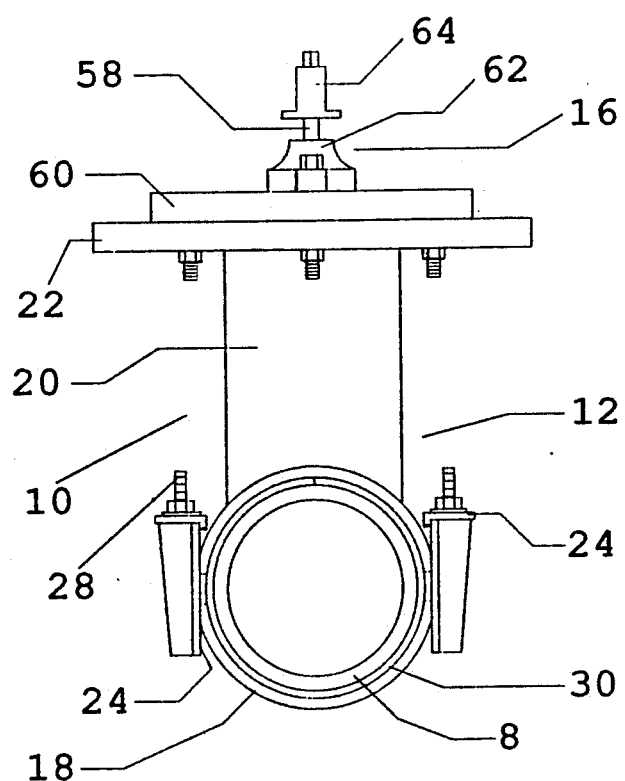
FIG. 2 is an end elevation view of the valve of the invention as installed in a fluid line.
Figure 3:
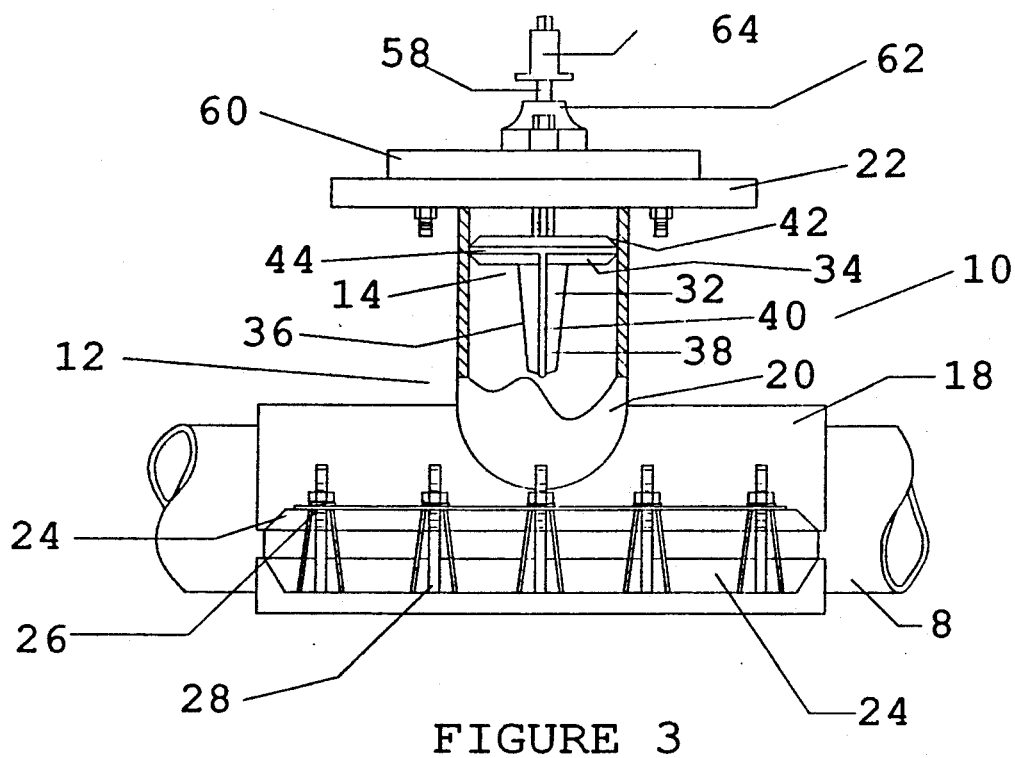
FIG. 3 is a partially sectioned side elevation view of the valve of the invention as installed in a fluid line, as oriented in FIG. 1.
Figure 4:
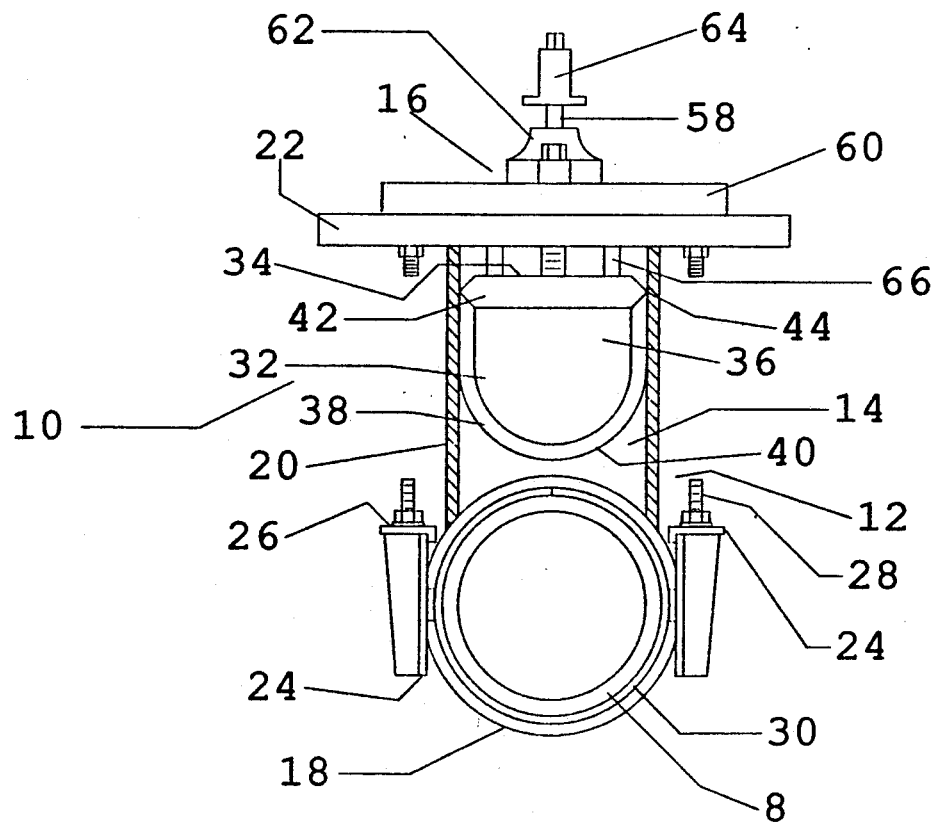
FIG. 4 is a partially sectioned end elevation view of the valve of the invention as installed in a fluid line, as oriented in FIG. 2.
Figure 5:
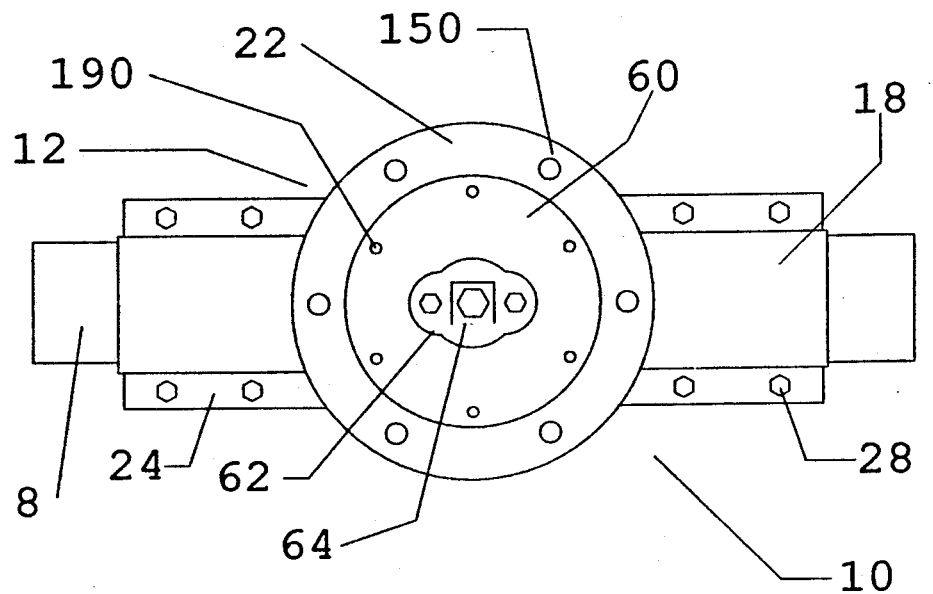
FIG. 5 is a plan view of the valve of the invention as installed in a fluid line.

DETAILED DESCRIPTION OF THE PREFERRED AND ALTERNATIVE EMBODIMENTS OF THE INVENTION

Referring now to the drawings, FIGS. 1 through 5 depict a typical fluid line or pipe 8 with the valve of the invention, designated generally by reference numeral 10, illustrated after a completed installation in accordance with the method of the invention. Valve 10 includes the major components of valve body 12, valve member 14, and valve actuating assembly 16. The invention is readily adaptable for installation in and use with a wide variety of types and sizes of fluid lines, and pipe 8 can accordingly be of almost any nominal size and any wall thickness, and of almost any material suitable for use to carry pressurized fluids, such as steel, cast iron, ductile iron, or plastic.

In the preferred embodiment of valve 10 of the invention, valve body 12 is of the same general configuration as a typical tapping sleeve apparatus, including a first elongate hollow tubular sleeve 18 and a hollow tubular neck 20 interconnected at one end to sleeve 18 intermediate its two ends surrounding an aperture penetrating sleeve 18 such that the hollow interiors of sleeve 18 and of neck 20 are in full communication. Neck 20 is interconnected to sleeve 18, with their respective longitudinal axes in perpendicular relation, by welding or other convenient conventional means. Neck 20 further includes annular neck flange 22 interconnected to the end of neck 20 opposite its interconnection to sleeve 18, with the central opening of neck flange 22 concentric with and of approximately the same diameter as the inside diameter of neck 20. The overall diameter of neck flange 22 is substantially greater than the inside diameter of neck 20, in order to accomodate the body of the installation apparatus of the invention, described below. Neck flange 22 is penetrated by a plurality of outer apertures, disposed symmetrically around the outer edge of neck flange 22 for interconnection of the body of the installation apparatus, and by a plurality of inner apertures disposed symetrically around the annulus of neck flange 22 inward from such outer apertures, for interconnection of valve actuating assembly 16 during the installation process described below. In the preferred embodiment of the invention, sleeve 18 and neck 20 are constructed of stainless steel, and neck flange 22 is constructed of common ductile steel, although it will be understood that other materials of construction having suitable properties for the intended use may be employed.

Neck 20 of valve body 12 may be provided with a consistent inside diameter through its length, but in the preferred embodiment illustrated in FIG. 17, neck 20 is formed with a flared upper end in order to facilitate the insertion of valve member 14 therethrough during the installation process. The diameter of the portion of neck 20 interconnected to sleeve 18, within which valve member 14 will seal, is substantially equal to the inside diameter of line 8, whether neck 20 is provided with straight sides or with a flared upper end. In an alternative approach, neck 20 may be formed with a beveled upper portion of neck 20 of a larger diameter than the lower portion, for the same purpose of facilitating insertion of valve member 14.

Sleeve 18 is divided longitudinally, in order that it may be placed around pipe 8 during installation of valve 10, to provide two mating halves. In the preferred embodiment sleeve 18 is completely divided, and each half is provided with bolting flanges 24, as illustrated in FIGS. 1 through 5, penetrated by a plurality of apertures 26 each to recieve a bolt and nut 28. It will be understood, however, that sleeve 18 may be interconnected around pipe 8 by other conventional means suitable to the particular installation, such as welding. During installation of sleeve 18 around pipe 8, a resilient liner 30 is placed between the inner surface of sleeve 18 and the outer surface of pipe 8 to ensure formation of a complete fluid-tight seal between sleeve 18 and pipe 8.

Valve member 14 is a double acting valve component, having a spade portion 32 and a disk-like portion 34 interconnected to spade portion 32 with the plane of disk-like portion 34 perpendicular to the plane of spade portion 32. Spade portion 32 includes opposed planar faces 36 and continuous curved edge 38. A raised sealing bead 40 is provided along the center line of edge 38. Sealing bead 40 will, upon installation of valve 10, contact the inner surface of pipe 8 and a portion of the inner surface of neck 20 to form a fluid-tight seal against the passage of fluid. In similar manner, disk-like portion 34 of valve member 14 includes continuous edge 42 and raised sealing ring 44 along the centerline of edge 42. Upon installation of valve 10, sealing ring 44 forms a sliding fluid-tight seal against the inner surface of neck 20, to prevent the flow of fluid from pipe 8 around valve member 14 through neck 20.

In an alternative embodiment, valve 10 may be readily adapted to provide one or more branch lines from line 8, with the flow of fluid into such branch line controlled by valve member 14. To provide a branch line, neck 20 is formed with a branch aperture penetrating the wall of neck 20 within the area traversed by disk-like portion 34 of valve member 14 during operation of valve 10, and a branch is interconnected to the exterior of neck 20 around such branch aperture in fluid-tight relation.

With additional reference to FIGS. 6 through 9, the preferred embodiment of valve member 14 will be seen to be structured as a unitary hollow body 46, preferably constructed of cast iron, covered on its exterior surface by jacket 48 formed of a deformable but shape retentive rubber or rubber-like material. Body 46 of valve member 14 is open at the top, or upper face of disk-like portion 34, and further includes threaded nut 50 loosely retained at the top of valve member 14 to receive a threaded valve operating stem therethrough. Nut 50 is retained and supported within the interior of body 46 by concave ledges 52 and retainer blocks 54, defining curved slots 56 within which nut 50 is loosely disposed.

Figure 6:
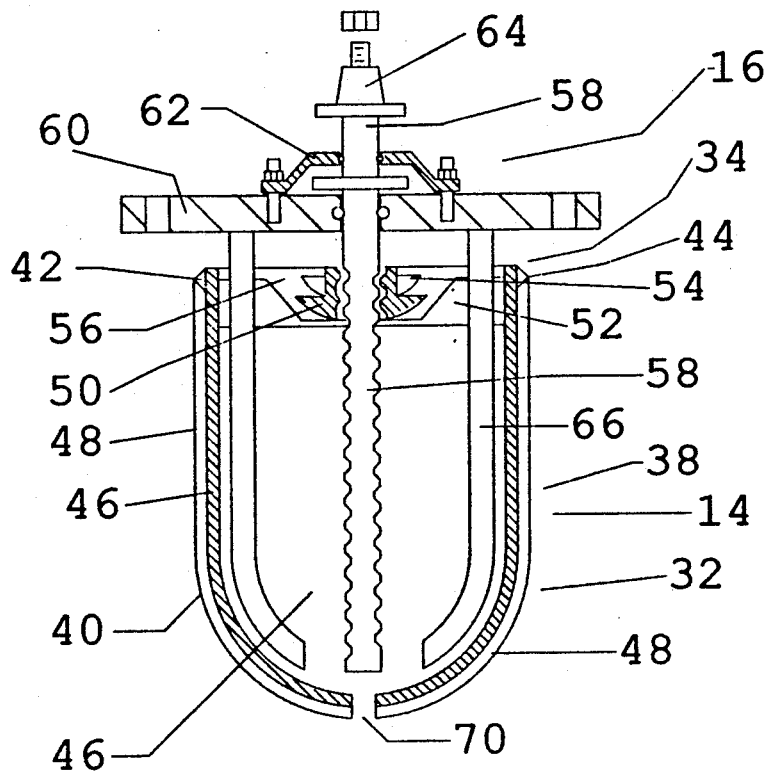
FIG. 6 is a sectioned elevation view of the valve member and the valve actuating member components of the valve of the invention.
Figure 7:
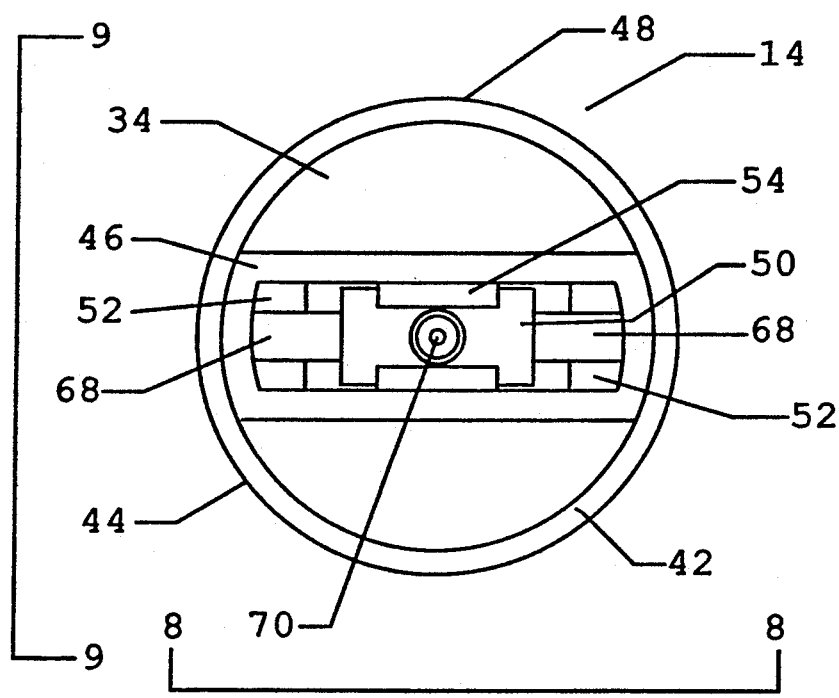
FIG. 7 is a top view of the valve member component of the valve of the invention.
Figure 8:
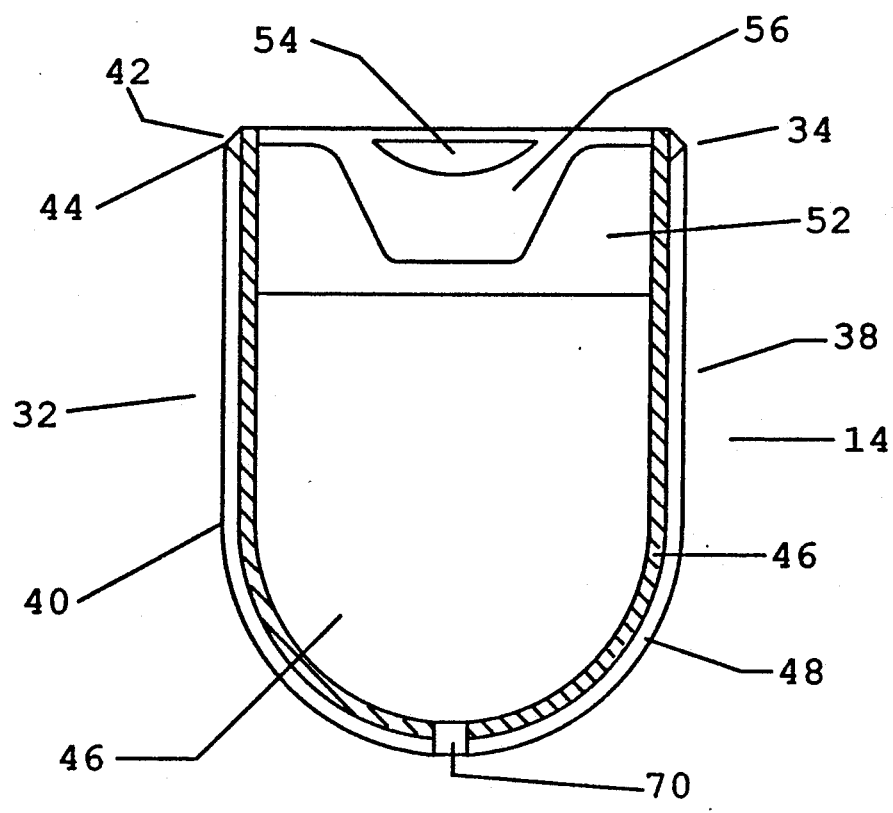
FIG. 8 is a sectional elevation view of the valve member component of the valve of the invention along line 8—8 of FIG. 7.
Figure 10:
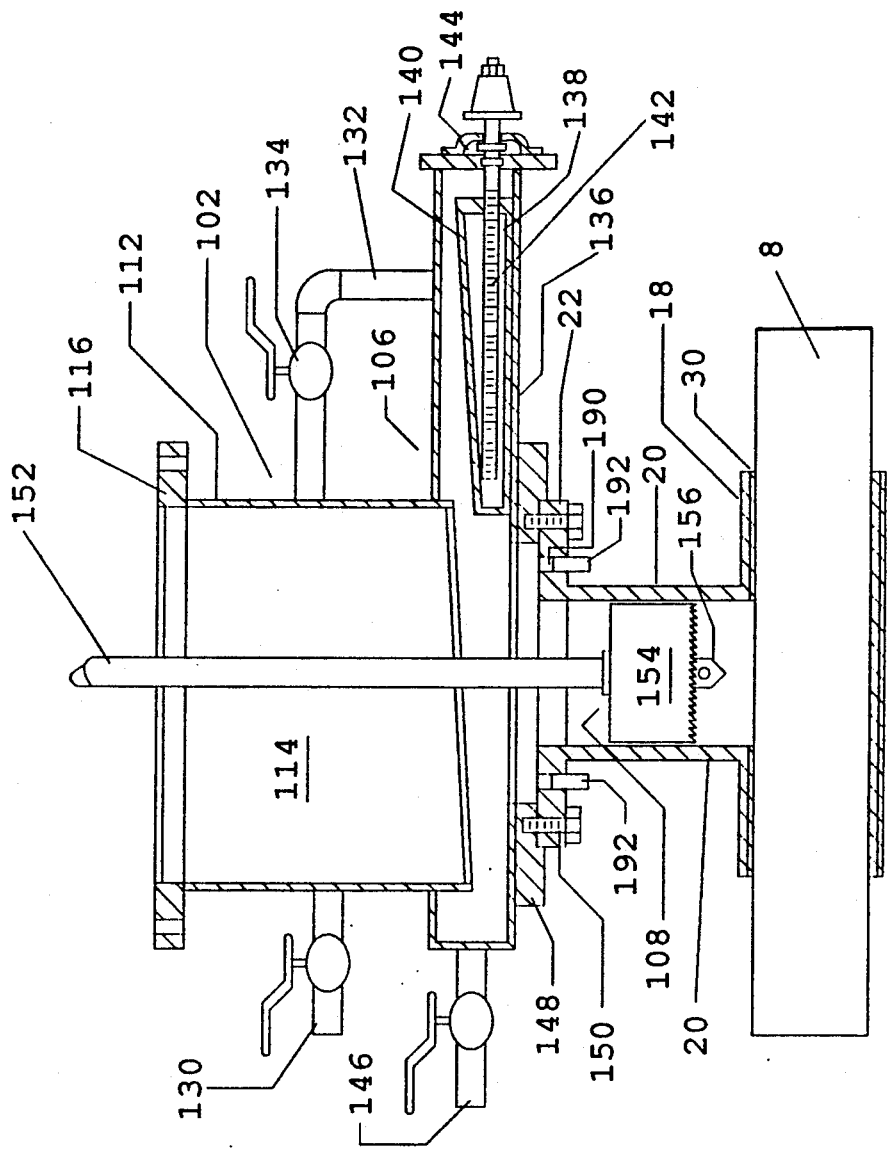
FIG. 10 is a sectional side elevation view of the valve body of the invention installed on a fluid line, with the body of the installation apparatus of the invention installed upon the valve body, and with the cutting device component of the installation apparatus inserted therein.
Figure 9:
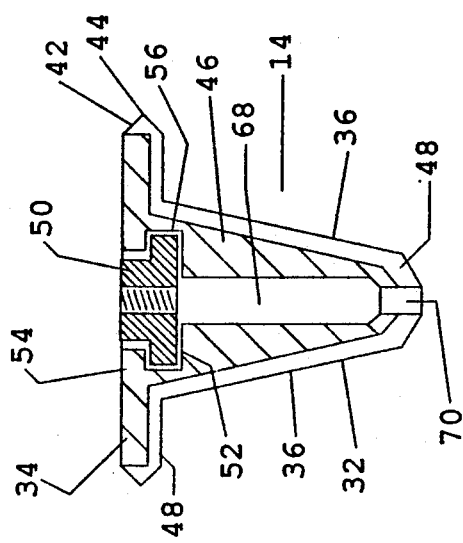
FIG. 9 is a sectional elevation view of the valve member component of the valve of the invention along line 9—9 of FIG. 7.

Valve actuating assembly 16, depicted in FIG. 6 as well as in FIGS. 1 through 5, includes valve operating stem 58, valve flange 60, seal plate 62, and operating nut 64. Operating stem 58 comprises an elongate cylindrical rod threaded over a majority of its length to be received through nut 50 in a mated threaded relationship. Valve flange 60 is a flat plate of circular configuration, penetrated by a central aperture through which operating stem 58 extends. Valve flange 60 is provided with a plurality of apertures extending around the outer circumference of valve flange 60, to receive studs or bolts for the purpose of positively aligning valve flange 60 with and firmly interconnecting valve flange 60 to neck flange 22 during installation of valve 10, as described in detail below. Seal plate 62 also includes a central aperture to be penetrated by operating stem 58, and is interconnected to valve flange 60 with their respective central apertures in coaxial alignment, and with operating stem 58 extending through those aligned apertures. Seal plate 62 is adapted to retain the upper portion of operating stem 58 so as to allow rotation of operation stem 58 relative to both seal plate 62 and valve flange 60 while preventing longitudinal movement of operating stem 58, as well as simultaneously sealing against flow of fluid through the central apertures of seal plate 62 and valve flange 60. The sealing of valve flange 60 against neck flange 22, of seal plate 62 against valve flange 60, and of seal plate 62 around operating stem 58 is accomplished by means of conventional O-rings and/or gaskets. Operating nut 64 is firmly interconnected to the upper end of operating stem 58 and serves to receive a valve operating handle (not shown) for the purpose of inducing rotation of operating stem 58 for activation of valve 10. As depicted in FIG. 6, valve actuating assembly 16 further includes a pair of elongate alignment rods 66 extending outwardly from and rigidly interconnected to the lower face of valve flange 60. Alignment rods 66 are disposed on a diameter line of valve flange 60 an equal distance on either side of the central aperture penetrating valve flange 60, and are received within the hollow interior of body 46 of valve member 14 through slots 68 disposed between ledges 52. Alignment rods 66 serve to prevent rotation of valve member 14 and maintain its alignment relative to pipe 8 during opening and closing of valve 10 following its installation.

Since valve member 14 seals against the inner surface of neck 20, and since the volume of the portion of neck 20 above valve member 14 is variable as valve 10 is opened and closed, with raising and lowering of valve member 14 within neck 20, valve member 14 is provided with bypass aperture 70 at the tip of spade portion 32, through sealing bead 40. As valve 10 is operated after its installation in pipe 8, fluid is allowed to flow through bypass aperture 70 and through the hollow interior and the open top of body 46 of valve member 14 between pipe 8 and the upper portion of neck 20, thereby equalizing the pressure between those otherwise separated volumes and hydraulically balancing the operation of valve member 14. When valve 10 is fully closed, with sealing bead 40 in tight contact with the inner surface of pipe 8, bypass aperture 70 is closed and fluid flow through the valve member 14 is prevented.

Valve 10 is installed in pipe 8 with the use of the installation apparatus of the invention, generally designated by reference numeral 100 and depicted in FIGS. 10 through 14. Installation apparatus 100 includes the major components of body 102, closure bonnet 104, closure valve 106, cutting device 108, and reaming device 110. In the preferred embodiment, body 102 comprises a hollow open-ended cylinder, of substantially greater diameter than neck 20 of valve body 12, with a continuous annular wall 112 surrounding the hollow interior 114, and an annular bonnet flange 116 interconnected at its inner edge to the upper end of wall 112. Bonnet flange 116 is penetrated by a plurality of apertures symetrically disposed about its periphery, to be aligned with matching apertures provided in closure bonnet 104 and receive attachment bolts therethrough to releaseably attach closure bonnet 104 to body 102 of the installation apparatus.

Closure bonnet 104, shown in FIG. 13, preferably comprises a hollow cylinder defined by annular wall 118, closed at its top by annular plate 120 and open at the bottom, having annular attachment flange 122 interconnected at its inner edge to the open end of wall 118, for attachment of closure bonnet 104 to body 102. A conventional gasket or O-ring seal is formed between bonnet flange 116 and attachment flange 122 to prevent escape of fluid therebetween during the installation procedure. Closure bonnet 104 further includes shaft collar 124, formed as an annular collar with a central opening, to be disposed on the upper face of annular plate 120 with their central openings in coaxial alignment, and removeably interconnected thereto by conventional means such as bolts. A fluid-tight seal is formed between annular plate 120 and shaft collar 124 by a conventional gasket or O-ring. The central opening of shaft collar 124 is threaded to receive one end of shaft 128 therein in fluid-tight relation, such that shaft 128 extends outwardly therefrom with its longitudinal axis perpendicular to the plane of annular plate 120 with shaft collar 124 connected thereto. Shaft 128 is retained relative to shaft collar 124 by retainer screw 126 extending through a threaded aperture in shaft collar 124 perpendicular to the longitudinal axis of shaft 128. Shaft 128 comprises an elongate hollow open ended cylinder threaded on its outer surface so as to mate with the threaded central opening of shaft collar 124. Shaft 128 includes conventional interior sealing means, preferably in the form of a plurality of O-rings, for the purpose of forming a fluid-tight sliding seal between the inner surface of shaft 128 and the outer surface of respective shafts associated with cutting device 108 and reaming device 110, to be extended through the interior of shaft 128.

Body 102 further includes bleed valve assembly 130 penetrating wall 112 to form a passageway for the selectively controlled flow of fluid from interior 114 of body 102. Wall 112 of body 102 is additionally penetrated by hollow bypass conduit 132, forming a fluid flow passageway between interior 114 of body 102 and the interior of closure valve 106. Bypass valve 134 is disposed in line with bypass conduit 132 for selectively opening and closing the fluid flow passageway formed thereby.

Body 102 of installation apparatus 100 includes closure valve 106 at its lower end, which valve is operable to form a fluid-tight separation between interior 114 of body 102 and the interior of neck 20 of valve body 12 during installation of valve 10. Closure valve 106 generally comprises a valve body 136, closure valve member 138, sealing gasket 140, closure valve operating stem 142, stem seal 144, and bleed valve assembly 146. In the preferred embodiment of the invention, valve body 136 is a hollow, substantially rectangular shallow box rigidly interconnected body 102. In order to enable the formation of a positive seal between closure valve member 138 and the interior 114 of body 102, wall 112 of body 102 extends a short distance into the interior of closure valve body 136 through an aperture formed in the upper wall of closure valve body 136 and the lower end of wall 112 is inclined at an angle equal to the angle of incline of the upper surface of closure valve member 138. The bottom wall of closure valve body 136 is penetrated by an aperture of approximately the same diameter as body 102 and in coaxial alignment therewith, so as to provide a continuous passageway through the interior of the closure apparatus. Annular coupling flange 148 is interconnected to the bottom wall of closure valve body 136 in coaxial alignment with the aperture disposed therein, for the purpose of coupling installation apparatus 100 to valve body 12 during installation of valve 10. Coupling flange 148 is penetrated by a plurality of threaded bolt apertures disposed to match outer apertures 150 provided around the outer edge of neck flange 22, to receive conventional bolts therethrough as installation apparatus 100 is coupled to valve body 12. Bleed valve assembly 146 penetrates one end wall of closure valve body 136 to form a passageway for the controlled flow of fluid from neck 20 through valve body 136 to the exterior of installation apparatus 100.

The closure valve member 138 of installation apparatus 100 comprises a hollow box-like structure dimensioned to fit within the interior of closure valve body 136, and of sufficient width and length to overlap the end of wall 112 extending into the interior of closure valve body 136. The box-like structure of closure valve body 136 includes a top plate inclined at an angle relative to the longitudinal axis of closure valve body 136, to match the angle of incline of the lower end of wall 112, a bottom plate, side plates, and end plates. A resilient sealing gasket 140, of approximately the same width and length as the top plate, is disposed on the upper surface of that top plate of closure valve member 138 to seal against the end of wall 112 as closure valve 106 is operated. The end plate in proximity to closure valve operating stem 142 is penetrated by an aperture through which closure valve operating stem 142 extends, as well as a stem nut and thrust bearing structure to cause closure valve member 138 to travel longitudinally within closure valve body 136 as closure valve operating stem 142 is rotated. Closure valve operating stem 142 is a threaded rod extending through an aperture in an end wall of closure valve body 136 and retained by stem seal 144, which functions to seal the stem aperture as well as retain closure valve operating stem 142 so that it is allowed rotational movement but not allowed longitudinal movement. Closure valve operating stem 142 extends beyond stem seal 144 and terminates in operating nut 146 to receive a valve handle for actuation of the closure valve 106.

Installation apparatus 100 also includes cutting device 108, which comprises elongate shaft 152, cutting member 154, and drill bit 156, all concentrically disposed on a common longitudinal axis and interconnected such that rotation of shaft 152 will induce rotation of cutting member 154 and of drill bit 156. The outside diameter of cutting member 154 is slightly smaller than the inside diameter of neck 20, so that cutting member 154 fits within the interior of neck 20 in close sliding relation therewith. Shaft 152 is of sufficient length to extend from pipe 8 through the interior of neck 20, through the interior of installation apparatus 100, and terminate above shaft 128, so that shaft 152 may be engaged above the upper end of shaft 128 for the purpose of actuating rotation and longitudinal movement of shaft 152 relative to shaft 128.

Installation apparatus 100 further includes reaming device 110, specifically depicted in FIGS. 11 and 12. Reaming device 110 includes elongate shaft 158, which is essentially identical to shaft 152 and serves the same purpose of transmitting longitudinal and rotational movement to reaming head 160. Reaming head 160 comprises a hemispherical blade holder 162, preferably having a thick wall and a hollow interior, annular connector plate 164 having an outside diameter equal to the diameter of hemispherical blade holder 162 and interconnected thereto across its diameter, cylindrical spindle 166 having a diameter equal to the diameter of the opening through annular connector plate 164 and interconnected thereto at one end of spindle 166, and top plate 168 having a diameter equal to the diameter of blade holder 162 and interconnected to the end of spindle 166 opposite its interconnection to connector plate 164. Blade holder 162, connector plate 164, spindle 166, and top plate 168 are disposed and interconnected in coaxial alignment.

Blade holder 162 includes a plurality of blade slots 170 symmetrically disposed radially around its hemisphere, extending from approximately the central point of its hemispherical surface over the majority of its curvature toward the face of the hemisphere, each blade slot to receive a cutting blade 172. Each cutting blade 172 comprises an elongate plate having one straight edge, to be inserted into one of blade slots 170, and a curved cutting edge with a curvature matching the curvature of blade holder 162. Slots 170 and cutting blades 172 are dimensioned such that when each cutting blade 172 is inserted into one of slots 170 the cutting edge of the blade extends outwardly a short distance from the curved face of blade holder 162. Each cutting blade 172 is releaseably retained within a slot 170 by means of a curved retainer bar 174, interconnected at one edge to a cutting blade 172 between its straight and curved edges and removeably interconnected to blade holder 162 by screws, as illustrated. In the preferred embodiment of the invention, blade holder 162 has five slots 170 and five cutter blades 172, but the number of such components may be varied without departing from the scope of the invention.

Reaming head 160 also includes a plurality of alignment rollers 176, for the purpose of precisely controlling the position of reaming head 160 within neck 20 of valve body 12 during installation of valve 10. Each alignment roller 176 is disposed between connector plate 164 and top plate 168, with its longitudinal axis parallel to the longitudinal axis of spindle 166. Each alignment roller 176 extends outwardly beyond the edges of connector plate 164 and top plate 168 a distance equal to the distance of extension of each of cutting blades 172 outwardly from the surface of blade holder 162. Alignment rollers 176 are retained by and rotate on pins 178, each of which extends through a pin aperture 180 longitudinally penetrating each alignment roller 176 along its longitudinal axis. Each pin 178 extends through an aperture 182 fully penetrating top late 168 near its perimeter and rests in an aperture 184 extending into, but not fully through, connector plate 164 and in coaxial alignment with aperture 182, and is retained therein by annular pin retainer plate 186. Pin retainer plate 186 is disposed concentric with top plate 168 with its outer edge extending over preferably at least half of the cross-sectional area of each roller pin 178, and is removeably interconnected to top plate 168 by a plurality of screws 188. In the preferred embodiment of reaming device 110 the number of alignment rollers 176 is eight, but any number sufficient to achieve positive alignment of reaming device 110 within neck 20 may be used.

As noted above, installation apparatus 100 is designed to be coupled to valve body 12 by means of bolts extending through coupling flange 148 of installation apparatus 100 into outer apertures 150 of neck flange 22. As also noted in the description of valve body 12, neck flange 22 is penetrated by a plurality of inner apertures, designated by reference numeral 190, which lie inward of outer apertures 150. Inner apertures 190 must be blocked during installation steps prior to interconnection of valve flange 60 to neck flange 22 in order to prevent blowout of pressurized fluid through apertures 190 following initial penetration of line 8.

In the preferred embodiment of neck flange 22, as shown in FIGS. 15, 16, and 17, each of inner apertures 190 is threaded to receive a hollow cylindrical nipple 192 extending outwardly from the face of neck flange 22 nearest line 8 in coaxial relation with the associated aperture 190. Each nipple 192 is open at one end and closed at the opposite end and is provided with screw threads on the outer surface of its open end to mate with the threads of each aperture 192. Each nipple 192 is removeably threaded into an aperture 190 in fluid-tight relation to releaseably close the passageways through apertures 190. Neck flange 22 is further preferably provided with a pair of valve locator grooves 194 extending into the face of neck flange 22 opposite nipples 192, to receive studs provided in valve flange 60 during installation of valve member 14 and valve actuating assembly 16 in order to facilitate proper alignment of valve flange 60 with neck flange 22. Each of valve locator grooves 194 is formed as an elongate curved groove, with one end aligned with one of apertures 190 and extending toward an adjacent aperture 190 along the curvature defined by apertures 190. Locator grooves 194 are preferably disposed in opposed relation across the central opening of neck flange 22.

In an alternative approach to sealing of apertures 190 during the installation sequence, a blowout preventer assembly 196 may be utilized with installation apparatus 100. The alternative blowout preventer assembly, illustrated in FIG. 18 and generally designated by reference numeral 196, comprises divided annular ring 198, adapted to be releaseably connected around neck 20 of valve body 12, connector flanges 200, stop bolts 202, and stop plates 204. Annular ring 198 is placed around neck 20 and connected thereto in frictionally retained relation by means of bolts and nuts extending through apertures in mated connector flanges 200. A stop bolt 202, threaded through an aperture in annular ring 198, is disposed below each inner aperture 190 of neck flange 22, into which a bolt and O-ring seal are inserted from the face of neck flange 22 nearest line 8. Each stop bolt 202 may be adjusted by threading it in or out relative to annular ring 198 to abut the head of a bolt inserted into an inner aperture 190 to firmly retain such bolt and O-ring seal therein and prevent the flow of fluid therethrough. Annular ring 198 is prevented from sliding down neck 20 by stop plates 204, disposed between annular ring 198 and the underlying portion of valve body 12. Each of stop plates 204 is interconnected at one end to annular ring 198 and formed with a concave curvature at its opposite end to be received against the curved exterior surface of sleeve 18. Stop plates 204 may be curved across their width to match the curvature of neck 20, if desired.

The preferred method of installation of valve 10 in a fluid line 8, using installation apparatus 100, will now be described. After the desired location in line 8 for installation of valve 10 has been selected and any necessary excavation to uncover and provide access to the desired portion of line 8 has been performed, the portion of the exterior surface of line 8 to receive sleeve 18 is first cleaned to remove foreign matter and provide a relatively smooth surface, and a valve body 12 with a neck 20 of the same inside diameter as the final inside diameter of pipe 8 is selected. To install valve body 12 on line 8, sleeve 18 with resilient liner 30 is placed around the circumference of line 8, with neck 20 extending in the desired direction for operation of valve 10. Bolts 28 are inserted through apertures 26 of flanges 12 and securely tightened to form a fluid tight seal between sleeve 18 and line 8. In the following disclosure it is assumed that sleeve 18 is installed with neck 20 extending in a vertical direction from line 8, and references to "top", "bottom", "upper", "lower", and the like will be used accordingly, though it will be recognized that neck 20 may be disposed at any angle to the vertical in actual practice of the method of the invention.

Body 102, with closure valve 106, of installation apparatus 100 is then attached to valve body 12 by placing coupling flange 148 on neck flange 22, with an approriate O-ring or gasket therebetween, and tightening bolts inserted through outer apertures 150 into matching threaded apertures in coupling flange 148 to form a fluid tight seal. In the preferred embodiment, inner apertures 190 of neck flange 22 are sealed against fluid flow by nipples 192, but bolts and O-ring seals may be inserted into inner apertures 190 and the alternative blowout preventer assembly 196 installed and adjusted to seal inner apertures 190, if desired. The free end of shaft 152 of cutting device 108, with cutting member 154 and drill bit 156 attached to the opposite end of shaft 152, is inserted through the interior of shaft 128 and through the O-ring seals provided therein so as to allow rotation and longitudinal movement of shaft 152 relative to shaft 128 while preventing flow of fluid through the interior of shaft 128. Closure bonnet 104, with shaft collar 124, and shaft 128 interconnected thereto and shaft 152 extending therethrough, is attached to body 102 by securely bolting attachment flange 122 to bonnet flange 116, with a suitable gasket or O-ring therebetween, such that cutting member 154 and drill bit 156 are disposed within the interior 114 of body 102, and the installation apparatus 100 is fully sealed against the escape of fluid from the interior thereof.

An actuating means 206, shown in FIG. 13, adapted to the dual purpose of inducing rotation of and longitudinal movement of shaft 152 relative to shaft 128, is connected to the upper end of shaft 128 and of shaft 152 extending above the upper end of shaft 128. In the preferred embodiment, actuating means 206 comprises a hydraulic motor 208 to produce rotational movement, annular feed collar 210, and variable length tube 212. Tube 212 is preferably comprised of telecoping inner and outer tube segments and clamp means to fix the relative positions of such tube segments. Motor 208, which includes a rotating output shaft and means of releaseable interconnection to shaft 152 or shaft 158, is rigidly interconnected to one end of tube 212 so as to induce rotation of shaft 152 or 158 relative to tube 212, and feed collar 210 is interconnected to the opposite end of tube 212 so as to allow rotational movement, but not longitudinal movement, of feed collar 210 relative to tube 212. The inner surface of annular feed collar 210 is threaded to mate with the outer threaded surface of shaft 128, and actuating means 206 is connected to shaft 128 by threading feed collar 210 onto the upper end of shaft 128.

With closure valve 106 opened, creating an unobstructed passageway through the installation apparatus and neck 20, cutting device 108 is lowered through the interior 114 of body 102 by reducing the length of tube 212, past closure valve 106, and into the interior of neck 120, which is positioned in coaxial alignment with shaft 128 and cutting device 108. The diameter of the cutting member 154 selected for each installation is such that the selected cutting member 154 fits closely within the interior of neck 20. When the lower end of drill bit 156 encounters the outer surface of line 8 the length of tube 212 is fixed and rotation of shaft 152 is induced by activation of motor 208, thereby inducing rotation of cutting device 108, and cutting device 108 is lowered by rotation of feed collar 210 around shaft 128, causing penetration of rotating drill bit 156 into pipe 8. Simultaneous rotation and lowering of cutting device 108 is continued until not only drill bit 156 but also cutting member 154 have fully penetrated into the interior of pipe 8. As drill bit 156 initially penetrates the wall of pipe 8, fluid confined therein under pressure will be forced upwardly through the penetration formed by drill bit 156, carrying cutting debris away from pipe 8, up neck 20 and into the interior 114 of body 102. Bleed valve 130 is opened to allow a continuous flow of fluid from pipe 8 and ensure that cutting debris resulting from the cutting actions of drill bit 156 and of cutting member 154 is washed through the installation apparatus and contamination of the fluid remaining in pipe 8 is prevented. The plug removed from pipe 8 upon full penetration of cutting member 154 is retained within the interior of cutting member 108 and removed therewith.

Upon completion of penetration of pipe 8 by cutting member 154, bleed valve 130 is closed and cutting device 108 is drawn upwardly from neck 20 and into the interior of body 102 above closure valve 106, which is then closed to separate the interior 114 of body 112 from the interior of neck 20 and pipe 8, which now contain fluid under full line pressure. The bolts securing closure bonnet 104 to body 102 are removed, and actuating means 206, shaft 128, shaft collar 124, closure bonnet 104 and cutting device 108 are removed. Shaft 152 of cutting device 108 is withdrawn from shaft 128 and shaft 158 of reaming device 110 is inserted therethrough and connected to actuating means 206, or, alternatively, a separate assembly of actuating means 206, shaft 128, shaft collar 124, closure bonnet 104 and reaming device 110, made up in advance, may be utilized. Reaming head 160, selected to closely fit within neck 20, attached to the lower end of shaft 158, is inserted into interior 114 of body 102 and closure bonnet 104 is attached to body 102 in the same manner as described above for the cutting device assembly.

With the interior of body 102 again sealed against escape of fluid, bleed valve 130 is opened slightly and bypass valve 134 is opened to allow fluid to flow from the interior of closure valve body 136 through bypass conduit 132 and into interior 114 of body 102, equalizing the fluid pressure on either side of closure valve member 138. Valves 130 and 134 are closed and closure valve 106 may now be easily opened, and reaming head 160 is lowered by the actuating means and inserted through neck 20 until cutting blades 172 contact the surface of the initial cut made in pipe 8 by cutting member 154. In the preferred embodiment of the method of the invention, the hole produced by cutting device 108 is in the range of one eight of an inch smaller than the final penetration to be produced by reaming device 110.

Rotation of reaming device 110 is initiated and downward force is imposed to force cutting blades 172 against pipe 8 in the same manner as described for the actuation of cutting device 108. Rotation and downward movement of reaming device 110 is continued until the penetration through the wall of pipe 8 is cut and smoothed to the same dimension as the inside diameter of neck 20, and until corrosion and/or deposits on the inner surface of pipe 8 are removed and that surface contacted by cutting blades 172 is clean and smooth. Bleed valve 130 is opened during the reaming operation, as during the cutting operation, to wash debris away from pipe 8 and prevent contamination of the fluid contained therein.

Upon completion of the reaming operation, the reaming device is withdrawn from neck 20 and into interior 114 of body 102 above closure valve 106, and closure valve 106 is closed. Bleed valve 130 is opened to relieve the pressure within interior 114, and closure bonnet 104 is disconnected from body 102 to remove the reaming device and allow installation of valve member 14 and valve actuating assembly 16.

Valve member 14 is assembled to valve actuating assembly 16, an appropriate gasket or O-ring is attached to the lower face of valve flange 60, and an elongate installation shaft, similar to shafts 152 and 158, is extended through the interior of shaft 128 and releaseably attached to the upper end of valve stem 58 at operating nut 64. Because the installation shaft is rotated to correctly align valve flange 60 with neck flange 22 during the installation procedure, it is necessary to prevent rotation of valve stem 58 relative to valve flange 60 as a result of that rotation of the installation shaft. In the preferred embodiment, an anti-spin bracket 214, comprising a flat plate formed with a longitudinally offset configuration and with apertures at respective ends, is removeably connected between operating nut 64 and seal plate 62, as illustrated in FIG. 19. Because the assembled valve member 14 and valve actuating assembly is longer than either cutting member 154 with drill bit 156 or reaming head 160, and because the length of body 102 of the installation apparatus is minimized to facilitate proper component alignment during the cutting and reaming operations, insertion of the assembled valve apparatus will typically require installation of extension cylinder 216 for that operation. Extension cylinder 216, shown in place upon body 102 in FIG. 14, is disposed between bonnet flange 116 and attachment flange 122, and connection is made with elongate bolts 218 extending therebetween alongside the outer surface of extension cylinder 216.

When closing of the installation apparatus against escape of fluid is accomplished, with the assembled valve components within the interior of extension cylinder 216 and interior 114 of body 102, bypass valve 134 is opened to equalize pressure and closure valve 106 is again opened. The assembled valve components are forced downward into neck 20, and the downward travel is continued until the studs of valve flange 60 contact neck flange 22. In the preferred embodiment, the studs of valve flange 60 to be received through the inner apertures 190 aligned with the pair of locator grooves 194 in neck flange 22 are slightly longer than the remainder of such studs, such that the longer studs contact the bottom of locator grooves 194 before the remaining studs contact the face of neck flange 22. The installation shaft connected to valve operating stem 58 is rotated, inducing rotation of valve flange 60 until the longer studs reach the ends of locator grooves 194 and drop into the associated inner apertures 190, assuring correct alignment of valve member 14 with neck flange 22 and allowing the remaining studs of valve flange 60 drop through the remaining inner apertures 190 of neck flange 22 and into the interior of nipples 192. Feed collar 210 of actuating means 206 is rotated relative to shaft 128 to firmly press valve flange 60 against neck flange 22, with the sealing gasket or O-ring therebetween, nipples 192 are removed from neck flange 22, and nuts are threaded onto the studs extending below the lower face of neck flange 22 and firmly tightened, interconnecting valve flange 60 to neck flange 22 with a fluid tight seal therebetween, closing the top of neck 20 and creating a permanent separation between the interior of neck 20 and installation apparatus 100. Bleed valve 30 may be opened to release fluid pressure within the interior of the installation apparatus, and the installation apparatus is removed, with removal of closure bonnet 104 from body 102, disconnection of the installation shaft from valve operating stem 58, removal of antispin bracket 214, and removal of body 102 from neck 20. A valve operating handle may then be interconnected to operating nut 64, fully completing the installation operation and readying the valve for use. In the event the alternative blowout preventer assembly 196 is utilized, the bolts extending upward through inner apertures 190 of neck flange 22 also serve to attach valve flange 60 to neck flange 22. As valve flange 60 is rotated relative to neck flange 22, valve flange 60 will drop slightly onto such bolts when correct alignment is achieved, and the attachment of valve flange 60 to neck flange 22 is effectuated by threading such bolts tightly into the threaded apertures of valve flange 60.

It will be understood that reaming device 110 may be used to smoothly remove a portion of the wall of pipe 8 where valve member 14 will seat, allowing the use of a single size valve member for each nominal pipe size and eliminating the need to provide a specific valve member size for each variation in the wall thickness of pipe 8.

The installation apparatus of the invention may subsequently be used to remove valve member 14 and valve actuating assembly 16 for replacement or repair, and may also be used with reaming device 110 to resurface the interior of pipe 8 to ensure proper seating of valve member 14 therein during continued operation of valve 10 over an indefinite period.

The foregoing detailed description of the preferred and various alternative embodiments of the invention is for purposes of illustration and not for limitation, and it will be readily understood that various other alternative embodiments and modifications may be made and used without departing from the scope and spirit of the invention as claimed.

What is claimed is:

1. A double-acting fluid flow control valve for installation in a fluid conduit, comprising a valve body having an elongate hollow tubular sleeve open at both ends to be interconnected to the fluid conduit in coaxial alignment therewith at the location determined for installation of the fluid flow control valve, an aperture penetrating said sleeve intermediate its two ends, and an open ended elongate hollow tubular neck, having first and second ends, with the cross-sectional configuration and internal dimensions of said neck matching the configuration and dimensions of said aperture, said neck being interconnected at its first end to said sleeve in coaxial alignment with said aperture and extending outwardly from said sleeve;

a double-acting valve member to be received in the interior of said body with the longitudinal axis of said valve member in coaxial alignment with the longitudinal axis of said neck of said body, having a spade portion for selectively controlling the flow of fluid along the longitudinal axis of the fluid conduit and a disk portion for preventing flow of fluid around said valve member in said neck of said valve body, with said spade portion having first and second ends and including two opposed separated faces each having first and second ends with the first ends defining a curve matching the curvature of the inside surface of the fluid conduit through which fluid flow is to be controlled, a continuous sealing edge extending between said faces along their edges and said first end to form a fluid-tight seal against said inside surface of said conduit and against a portion of said neck and define a hollow in the interior of said spade portion, and with said disk portion being a substantially planar disk with a continuous edge matching the cross-sectional configuration of said neck and dimensioned such that said disk will be received in said neck in closely mating fluid-tight sliding relationship therewith when said valve member is inserted into said neck, said disk being interconnected to said second end of said spade portion with the plane of said disk perpendicular to the longitudinal axis of said spade portion, and said disk being penetrated by an aperture interconnecting with said hollow of said spade portion, said valve member further including a threaded valve nut; and a valve actuating assembly including an annular valve flange adapted to be removeably interconnected in fluid-tight relation to the second end of said neck of said body, an elongate valve operating stem with first and second ends, threaded over a majority of its length to be operatively interconnected to said valve member by threading said first end of said valve operating stem through said threaded valve nut of said valve member, disposed and loosely retained in said aperture of said disk such that said valve nut is prevented from rotational and longitudinal movement relative to the longitudinal axis of said valve member so as to prevent binding of said valve nut and said valve operating stem during longitudinal movement of said valve member, with said valve operating stem extending through the central opening of said annular valve flange with its longitudinal axis perpendicular to the plane of said valve flange, a seal plate having a central aperture, said seal plate interconnected to said valve flange in fluid-tight relation with said valve operating stem extending through said central aperture, and said seal plate having sealing means to form a fluid-tight seal between said seal plate and said valve operating stem while allowing rotational movement of said valve operating stem relative to said seal plate and further having retaining means to retain said valve operating stem so as to allow rotational movement of said valve stem relative to said seal plate while preventing longitudinal movement of said valve stem relative to said seal plate, and valve member alignment means interconnected to the face of said valve flange nearest said second end of said valve operating stem for the purpose of preventing rotational movement of said valve member relative to said valve flange while allowing longitudinal movement of said valve member along said valve operating stem and maintaining alignment of said valve member relative to said valve body as said valve operating stem is rotated with said first end of said valve operating stem threaded through said valve nut.

2. THe double-acting fluid flow control valve of claim 1, wherein said sleeve of said valve body is longitudinally divided into two separable portions, said aperture is disposed in and said neck is interconnected to one of said portions, and said sleeve includes means of releaseably interconnecting said sleeve to the fluid conduit in fluid-tight relation therewith.

3. The double-acting fluid flow control valve of claim 1, wherein said sleeve and said neck are circular in cross-sectional configuration.

4. The double-acting fluid flow control valve of claim 1, wherein the fluid conduit in which the valve is to be installed is circular in cross-sectional configuration, said neck is circular in cross-sectional configuration, and the diameter of said neck at its frist end is approximately equal to the diameter of the fluid conduit.

5. The double-acting fluid flow control valve of claim 1, wherein the fluid conduit in which the valve is to be installed is circular in cross-sectional configuration, said neck is circular in cross-sectional configuration, and the diameter of said neck at its first end is greater than the inside diameter of the fluid conduit but smaller than the outside diameter of the fluid conduit.

6. The double-acting fluid flow control valve of claim 1, wherein the longitudinal axis of said neck is perpendicular to the longitudinal axis of said sleeve.

7. The double-acting fluid flow control valve of claim 1, wherein the exterior surface of said valve member is coated with a rubber-like material.

8. The double-acting fluid flow control valve of claim 1, wherein said valve member is formed of a rigid material and is continuously coated on the exterior thereof with an elastic rubber-like material.

9. The double-acting fluid flow control valve of claim 1, wherein said sealing edge of said spade portion of said valve member includes a raised elastic sealing bead extending continuously along said sealing edge.

10. The double-acting fluid flow control valve of claim 1, wherein said edge of said disk portion includes a raised elastic sealing bead extending continuously around said edge.

11. The double-acting fluid flow control valve of claim 1, wherein said valve member further includes hydraulic balancing means for equalizing fluid pressure on either side of said valve member with the fluid flow control valve in other than a fully closed position following its installation in a fluid conduit.

12. The double-acting fluid flow control valve of claim 11, wherein said hydraulic balancing means comprises a by-pass aperture penetrating said spade portion of said valve member at the first end thereof in coaxial alignment with the longitudinal axis thereof to create a fluid passage from the exterior of said valve member at its first end through the interior thereof to its second end, whereby said passage is closed when said first end of said valve member is against the inner surface of the fluid conduit and opened when said first end of said valve member is removed from said inner surface.

13. The double-acting fluid flow control valve of claim 1, wherein said valve member alignment means of said valve actuating assembly comprises a pair of elongate alignment rods extending outwardly from and rigidly interconnected to the face of said valve flange opposite the interconnection of said seal plate to said valve flange, with said alignment rods disposed on a diameter line of said valve flange in opposed relation across the central axis of said valve flange, and with said alignment rods to be received within the hollow interior of said valve member through the aperture penetrating the disk of said valve member upon interconnection of said valve actuating assembly to said valve member.

14. The double-acting fluid flow control valve of claim 1, wherein said valve body further includes an annular neck flange with its central opening configured and dimensioned to match the cross-sectional configuration and dimensions of said neck, interconnected to the second end of said neck to mate with said valve flange of said valve actuating assembly during installation of the valve.

15. The double-acting fluid flow control valve of claim 14, wherein said annular neck flange is of larger diameter than said valve flange of said valve acutating assembly, said valve flange includes a plurality of valve flange apertures symmetrically disposed around the periphery of said valve flange to receive mounting bolts therethrough, said neck flange includes a plurality of inner neck flange apertures symmetrically disposed around said neck flange near its inner edge to match with said valve flange apertures during installation of said valve member and valve actuating assembly in said valve body, and said neck flange further includes a plurality of outer neck flange apertures symmetrically disposed around said neck flange near its outer edge to receive bolts therethrough for interconnection of a valve installation apparatus to said neck flange during insstallation of the valve in a fluid conduit.

16. The double-acting fluid flow control valve of claim 1, wherein said valve body further includes a resilient liner disposed on the inner surface of said sleeve for the purpose of forming a fluid-tight seal between said sleeve and the fluid conduit during installation of the fluid flow control valve in the fluid conduit.

17. The double-acting fluid flow control valve of claim 1, wherein said second end of said neck is beveled from the outer edge of said second end to the inner edge of said second end such that said second end is inclined toward the interior of said neck to facilitate insertion of said valve member during installation of the fluid flow control valve.

18. The double-acting fluid flow control valve of claim 1, wherein a longitudinal portion of said neck extending from said second end toward said first end of said neck, above the portion of said neck in which said valve member will operate after installation of the fluid flow control valve, is of larger diameter than the balance of said neck to facilitate insertion of said valve member into said neck.

19. The double-acting fluid flow control valve of claim 1, adapted for the connection of one or more branch fluid conduits to the existing fluid conduit, wherein said neck of said valve body includes one or more apertures penetrating said neck below the position of said disk of said valve member in said neck with the installed fluid flow control valve in a fully open position, a hollow branch stub interconnected to said neck in fluid-tight relation surrounding each of said one or more apertures, and means for interconnecting a branch fluid conduit or branch stub plug to each of said branch stubs.

20. The double-acting fluid flow control valve of claim 1, wherein annular valve flange of said valve actuating assembly includes a plurality of mounting studs, at least two of which are of greater length than the remainder to function as locator studs, symmetrically disposed around and extending downward from the valve flange for interconnection of the valve actuating assembly to the second end of said neck of said valve body, and wherein said valve body further includes a neck flange comprising:
  an annular plate, having an upper face to receive said valve flange thereagainst and a lower face, with a central opening configured and dimensioned to match the configuration and dimensions of the second end of the neck, interconnected to the second end of the neck in fluid-tight relation;
  a plurality of outer neck flange apertures penetrating said plate of the neck flange and symmetrically disposed around said plate near its outer edge;
  a plurality of inner neck flange apertures, equal in number to the number of mounting studs of the valve flange of the valve actuating assembly penetrating said plate and symmetrically disposed around said plate near its inner edge so as to receive the mounting studs therethrough, each of said inner neck flange apertures being threaded on its inner surface;
  at least two elongate curved locator grooves extending into said plate from its upper face, with the curvature of said locator grooves matching the curve defined by said inner neck flange apertures, each of said locator grooves disposed in said upper face of said plate with one end of each of said locator grooves in alignment with a different one of said inner neck flange apertures and extending toward an adjacent inner neck flange aperture along the curve defined by said inner neck flange apertures, each said locator groove to receive one of the locator studs of the valve flange during installation of the valve; and
  a plurality of elongate hollow nipples equal in number to the number of said inner neck flange apertures, each of said nipples having an open first end and a closed second end and being threaded on at least a portion of its outer surface extending from said first end toward said second end, each of said nipples being threaded into one of said inner neck flange apertures in coaxially aligned fluid-tight relation therewith from said lower face of said plate of the neck flange, and each of said nipples being of greater length than the distance of extension of the mounting studs of the valve flange beyond said lower face of said plate with the neck flange in place against said upper face of said plate.

21. A hydraulically balanced double-acting valve member for use in a valve body having an elongate hollow tubular sleeve with an aperture penetrating the sleeve intermediate its ends, and an elongate hollow open ended tubular neck interconnected to and extending outwardly from the sleeve surrounding and in alignment with the aperture penetrating the sleeve, comprising a spade portion of greater length than width and of greater width than thickness, having a width approximately equal to the inside diameter of the neck of the valve body near the interconnection of the neck to the sleeve of the valve body, said spade portion having first and second ends with the first and formed in a semi-circular curvature, having a smooth sealing surface extending continuously along the edges and said first end of said spade portion, and having a substantially hollow interior;

a disk portion with upper and lower faces and an edge defining a circle, having a smooth sealing surface extending continuously around said edge, with the diameter of said disk portion approximately equal to the width of said spade portion, said disk portion interconnected at its lower face to the second end of said spade portion with the central axis of said disk portion in alignment with the longitudinal axis of said spade portion, and including a slot-like aperture extending from said upper face through said disk portion to connect with the substantially hollow interior of said spade portion;

hydraulic balancing means for the purpose of equalizing fluid pressure between the portions of the neck of the valve body lying on opposite sides of the valve member with the valve member installed in the valve body and with the valve member in other than a fully closed position; and a threaded valve member operating nut, to receive an elongate threaded valve operating stem, disposed in said slot-like aperture of said disk portion and loosely retained therein so as to allow limited movement of said operating nut within said slot-like aperture while preventing significant rotational and longitudinal movement of said operating nut relative to said disk portion, so as to prevent binding of said valve nut and the valve operating stem during longitudinal movement of the valve member within the neck of the valve body.

22. The hydraulically balanced double-acting valve member of claim 21, wherein said hydraulic balancing means comprises a bypass aperture extending from the outer surface of said spade portion to the substantially hollow interior thereof in coaxial alignment with the longitudinal axis of said spade portion, creating a passageway for the flow of fluid through the interior of the valve member.

23. The hydraulically balanced double-acting valve member of claim 21, further comprising an elastic jacket firmly interconnected to the outer surfaces of said spade portion and of said disk portion.

24. The hydraulically balanced double-acting valve member of claim 21, wherein said sealing surface of said spade portion includes at least one raised elastic spade sealing bead extending continuously along said sealing surface, and said sealing surface of said disk portion includes at least one raised elastic disk sealing bead extending continuously around said sealing surface.

25. The hydraulically balanced double-acting valve member of claim 24, further comprising an elastic jacket firmly interconnected to the outer surfaces of said spade portion and of said disk portion, and wherein said spade sealing bead and said disk sealing bead are integrally formed with said jacket as a part thereof.

* * * * *